United States Patent
Williams, Jr.

(10) Patent No.: US 9,232,779 B2
(45) Date of Patent: Jan. 12, 2016

(54) HORSE LEG AND HOOF SUPPORT STAND

(76) Inventor: Harlan Cooper Williams, Jr., Hampstead, MD (US)

(*) Notice: Subject to any disclaimer, the term of this patent is extended or adjusted under 35 U.S.C. 154(b) by 1164 days.

(21) Appl. No.: 12/711,288

(22) Filed: Feb. 24, 2010

(65) Prior Publication Data
US 2011/0203811 A1  Aug. 25, 2011

(51) Int. Cl.
A01L 11/00 (2006.01)
A01L 13/00 (2006.01)
A01L 15/00 (2006.01)

(52) U.S. Cl.
CPC .............. *A01L 11/00* (2013.01); *A01L 13/00* (2013.01); *A01L 15/00* (2013.01)

(58) Field of Classification Search
CPC .................................................... A01L 11/00
USPC .............. 168/44; 119/816; 248/121, 122.1, 248/176.1, 177.1, 178.1, 354.1
See application file for complete search history.

(56) References Cited

U.S. PATENT DOCUMENTS

| | | | | |
|---|---|---|---|---|
| 124,452 A | * | 3/1872 | Shimer | 168/44 |
| 457,345 A | * | 8/1891 | Fox | 168/44 |
| 466,618 A | * | 1/1892 | McDonald | 168/44 |
| 541,105 A | * | 6/1895 | Menard | 168/44 |
| 1,035,734 A | * | 8/1912 | Plamondon | 168/48.2 |
| 1,270,204 A | * | 6/1918 | Pinegar | 168/44 |
| 1,278,628 A | * | 9/1918 | France et al. | 168/44 |
| 3,696,869 A | * | 10/1972 | Anding | 168/44 |
| 7,334,643 B2 | | 2/2008 | Keeler | |
| 7,387,171 B2 | | 6/2008 | Keeler | |
| 7,510,021 B2 | | 3/2009 | Tyree | |
| 2006/0113090 A1 | * | 6/2006 | DeCola et al. | 168/44 |

* cited by examiner

Primary Examiner — Son T Nguyen
(74) Attorney, Agent, or Firm — Laubscher, Spendlove & Laubscher, P.C.

(57) ABSTRACT

A support stand for supporting the leg and hoof of a horse includes a base member adapted for seating on a horizontal support surface, and a hoof receptacle including bottom, rear end, and side walls that cooperate to define an open topped hoof-receiving chamber that is open at its forward end. A vertical adjustment device serves to adjust the vertical position of the hoof receptacle relative to the base. The hoof receptacle is connected with the vertical adjustment device for pivotal displacement about a horizontal pivot axis parallel with the receptacle rear wall, and an angle adjustment device serves to adjust the angular orientation of the hoof receptacle relative to the vertical adjustment rod. Accordingly, the horse leg is held in a flexed, pre-set position by adjustment of the leg and hoof support.

4 Claims, 2 Drawing Sheets

HORSE LEG AND HOOF SUPPORT STAND

BACKGROUND OF THE INVENTION

1. Field of the Invention

The present invention relates generally to a support stand for a horse's leg and hoof for use by veterinarians, horse owners and other people, who need a stable, adjustable and safe support device.

2. Brief Description of the Prior Art

The current method of support of a horse's leg by most veterinarians, horse owners and other people places such individuals in a dangerous and physically demanding position. Many veterinarians physically support a horse's leg during their medical operations by holding the horse's leg between their own legs. In the alternative, veterinarians and others may simply hold the horse's leg above ground level during the medical procedure. These individuals become physically tired, are in risk of injury due to sudden movements by the horse, and are exposed repeatedly to radiation during such operations.

The Keeler U.S. Pat. Nos. 7,387,171 and 7,334,643 disclose an adjustable horse leg stand. The horse leg stand includes a stable base and a hoof platform that is slidably received by the receiving portion of the base and can be adjusted in the vertical direction and can be locked at selected heights in a non-incremental, continuous range of heights. One hoof platform of the subject invention includes a diverging U-shaped cradle. This hoof platform may include a flexible strap used to form a hoof receiving sling. Other hoof platforms are discussed and include one such hoof platform, which sits horizontally and is not adjustable, to receive the bottom of a hoof.

The Tyree U.S. Pat. No. 7,510,021 discloses a hoof care stand that includes a two-dimensionally curved leg receiving portion which is flexibly attached to the stand base via a flexible attachment member such as a spring. The vertical attachment rod provides for adjustment in the vertical direction.

The prior art devices uncomfortably restrain the horse leg in a manner that would result in injury to both the horse and the individual performing the operations. When a horse becomes startled, the horse's natural inclination is to move backwards. If restrained, the horse's sudden movement will likely injure both the horse and the personnel working with the horse. Moreover, the prior art devices tend to support the horse's leg in a manner that slows the completion of the operations, and reduces the quality and consistency of such operations, because the prior art devices do not afford adjustment from the horizontal and fail to provide adequate support necessary to perform certain medical processes.

What is needed is a safe stand that comfortably holds the horse leg and hoof in a pre-set position by adjustment of the leg and hoof support. By setting the position of the hoof through a range from the horizontal position to other positions relative to the horizontal, the horse leg would be positioned in a flexed, pre-set position. What is further needed is to comfortably hold the horse leg in such pre-set position while not strapping in place or excessively restraining the horse's leg.

SUMMARY OF THE INVENTION

Accordingly, a primary object of the present invention is to provide a support stand for supporting the leg and hoof of a horse, including a base member adapted for seating on a horizontal support surface, and a hoof receptacle including a generally horizontal bottom wall, and a rear end wall and two opposed spaced side walls extending upwardly from the bottom wall to define a hoof-receiving chamber that is open at the top and at its forward end. Vertical adjustment devices serve to adjust the vertical height of the hoof receptacle relative to the base, and angle adjustment devices serve to adjust the angular orientation of the hoof receptacle relative to the vertical adjustment devices. Accordingly, the horse leg is held in a flexed, pre-set position by adjustment of the leg and hoof support. The present invention could be used by veterinarians and others in conjunction with other medical equipment and devices, such as x-ray machines, to perform medical procedures.

According to another object of the invention, the base member has a large flat base and an upright receiving portion centrally extending from the base. The adjustable support device is slidably received by the receiving portion of the base and can be adjusted in the vertical direction.

The adjustable support device includes a leg and hoof receptacle portion, an adjustment mechanism and a vertical support. The adjustable receptacle portion consists of a flat platform which supports the bottom of the horse's hoof and limits downward motion and further includes additional structure that sits in the vertical plane and extends downward. The sides of the upper portion of the receptacle are angled and curved in a concave configuration to support the convex front and sides of the horse's hoof, thereby limiting downward motion along the leg's axis and lateral motion side to side. By not restricting movement in the posterior direction, the horse's leg can be easily moved backwards to remove the leg from the hoof receptacle. The hoof receptacle takes advantage of the fact that horses tend to rest comfortably when exerting forward and downward pressure. The hoof receptacle allows a startled horse to move backwards, as is its natural inclination, and easily lift its leg out of the hoof receptacle.

The adjustable receptacle portion is connected to the vertical support via a pin and collar. The adjustable receptacle portion can be manually rotated about the lateral axis so as to be adjusted through a range of positions relative to the horizontal. The adjustable receptacle portion may be locked in place at incremental positions relative to the horizontal via a pin and collar means.

The horse stand also includes a lock mechanism that locks the hoof platform in the base at selected heights in a non-incremental, continuous range of heights.

BRIEF DESCRIPTION OF THE FIGURES

Other objects and advantages of the subject invention will become apparent from a study of the following specification when viewed in the light of the accompanying drawing, in which.

DETAILED DESCRIPTION

Figure 1:
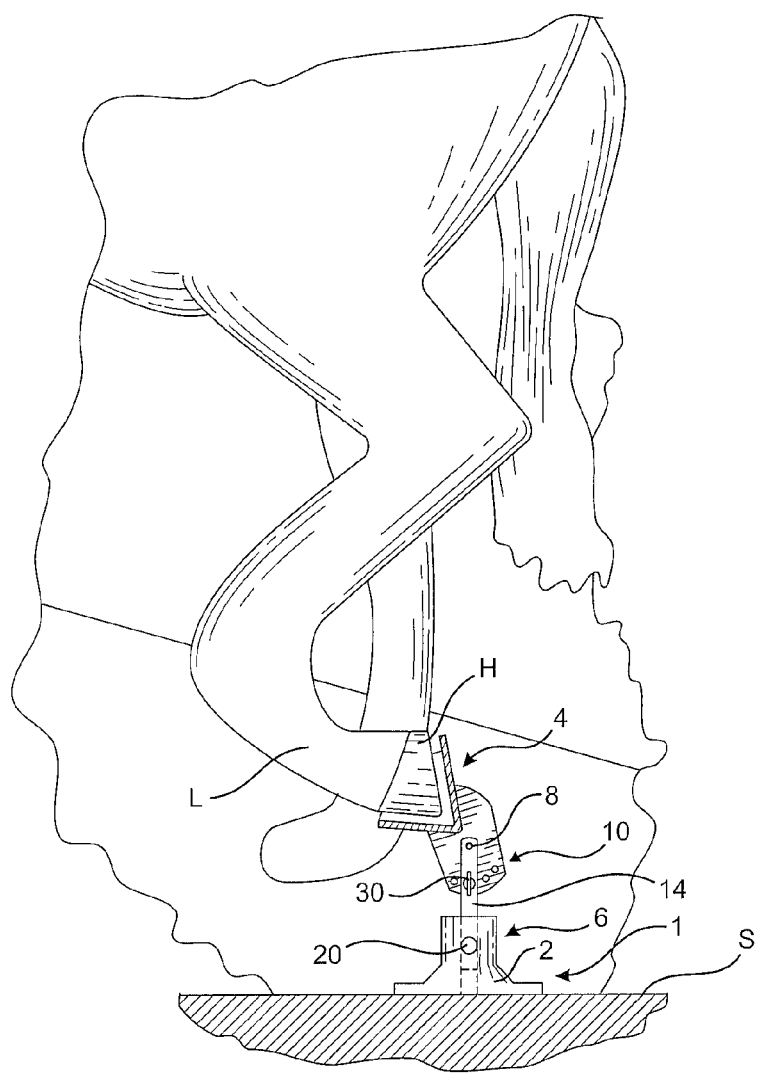
FIG. 1 is a perspective view illustrating the manner in which the leg and hoof support stand of the present invention is used in connection with a horse.

Referring first more particularly to FIG. 1, the support stand 1 of the present invention is designed to support the hoof portion H and the leg portion L of a horse relative to a fixed horizontal support surface S. The support stand includes a base member 2, a vertical support rod 14 mounted for vertical displacement relative to the base member, and a hoof receptacle 4 pivotally connected with the upper end of the support rod for pivotal displacement about a horizontal pivot shaft 8. A height adjustment device 6 controls the height of the hoof receptacle relative to the fixed support surface, and an angle adjustment device 10 controls the angle of the hoof receptacle relative to the vertical support rod 14.

Figure 4:
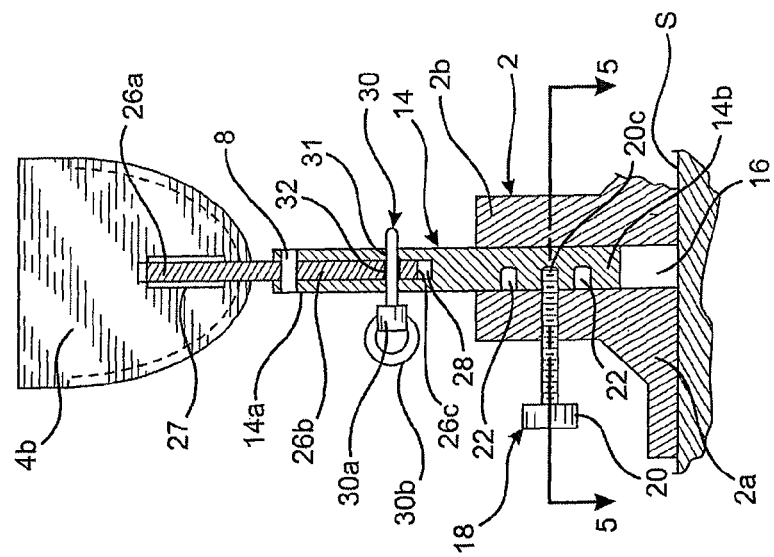
FIG. 4 is a sectional view taken along line 4-4 of FIG. 2.
Figure 3:
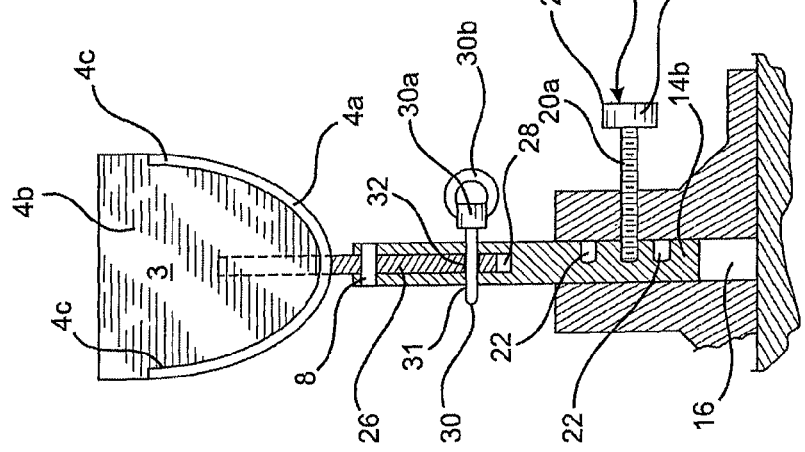
FIGS. 2 and 3 are side elevation and partly sectioned front views, respectively, of the stand of FIG. 1.
Figure 2:
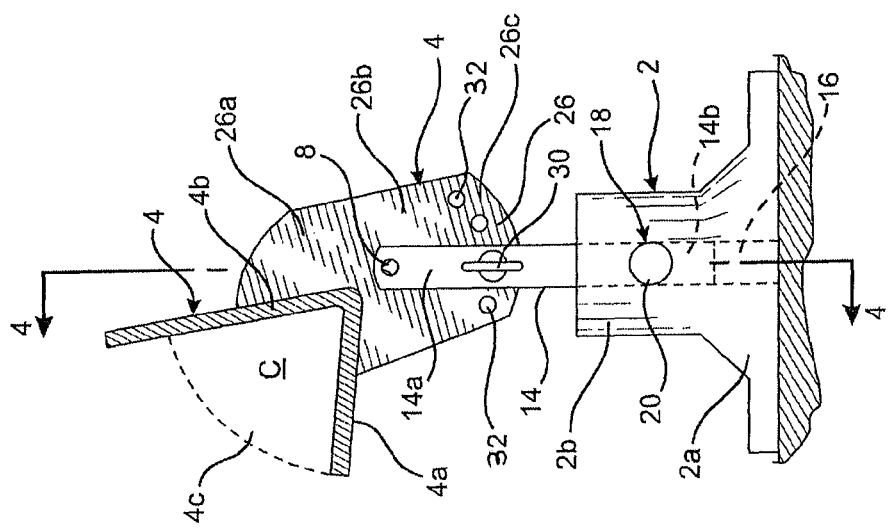

Referring now to FIGS. 2-4, the base member 2 includes a lower portion 2a and an upwardly extending generally cylindrical pedestal portion 2b, the base member containing a vertical through bore 16. The lower end 14b of the support rod is slidably mounted in the vertical through bore 16, and the upper end 14a of the support rod is bifurcated to define a slot 28. Pivotally mounted on the horizontal pivot shaft 8 that extends between the upper wall portions of slot 28 is the intermediate portion 26b of an angle adjustment plate 26. The upper end 26a of the angle adjustment plate is secured to the hoof receptacle 4, and the lower end of the adjustment plate terminates adjacent the bottom of the slot 28.

The hoof receptacle 4 includes a bottom wall 4a, a rear wall 4b, and a pair of opposed parallel side walls 4c, which walls cooperate to define an open-topped chamber C that is also open at its front end, thereby to receive the hoof of the horse as shown in FIG. 1. As best shown in FIG. 3, the bottom wall 4a of the hoof receptacle means is concave in the upward direction, and the rear wall 4c is flat, as shown in FIG. 2. The walls of the hoof receptacle means are preferably formed of metal, and the upper end 26a of the orthogonally arranged metal adjustment plate 26 is rigidly secured, for example, by weld seams 27 (FIG. 4), to the external surfaces of the rear end and bottom walls. The pivot shaft 8 is parallel with the receptacle rear wall 4b.

The angle adjustment mechanism 10 include an angle adjustment pin 30 that is mounted for axial displacement in opposed aligned openings 31 contained in the walls of the upper end 14a of the support rod, and through a selected one of a plurality of angle adjustment openings 32 contained in the lower end portion 26c of the angle adjustment plate 26. The angle adjustment pin includes an enlarged head portion 30a provided with a pull ring 30b. Thus, when the angle adjustment plate 26 is pivoted about the pivot shaft 8 to produce a desired angular orientation of the hoof receptacle 4 relative to the vertical rod 14, the angle adjustment pin 30 is inserted into the corresponding openings 31 and 32 to fasten the hoof receptacle in the desired angular orientation.

Figure 5:
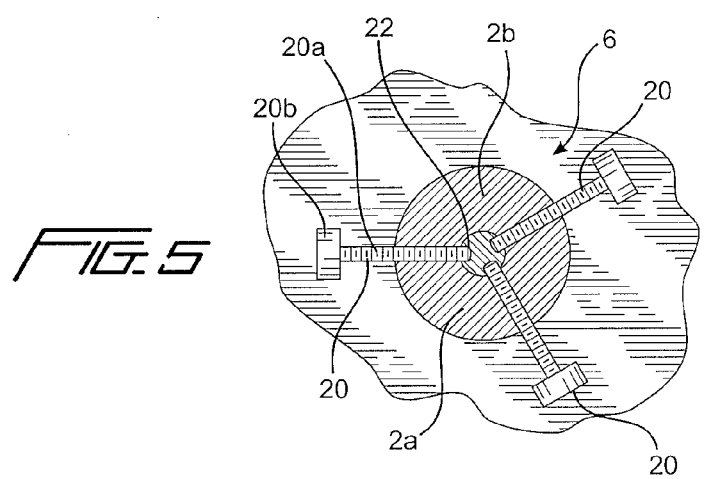
FIG. 5 is a sectional view taken along line 5-5 of FIG. 4.

As best shown in FIGS. 3-5, the height adjustment mechanism 6 comprises a plurality of angularly arranged locking bolts 20 having body portions 20a threadably connected in threaded radial bores provided in the pedestal portion 2b of the base member 2. At their ends externally of the base member, the locking bolts are provided with enlarged operating head portions 20b. When the support rod 14 has been axially vertically displaced to a desired position relative to the base member 2 (and consequently, to the support surface S), the radially arranged locking bolts may be rotated by their enlarged head portions 20b, thereby to cause the other ends 20c thereof to extend into corresponding ones of the vertically spaced locking openings 22. Of course, if the locking openings 22 were to be omitted, the ends 20c of the locking bolts could be brought into frictional engagement with the circumferential surface of the support rod 14, thereby to lock the support rod to the base. Furthermore, the vertically spaced openings 22 could be replaced with vertically spaced annular grooves.

It will be seen that by appropriate angular adjustment of the hoof receptacle 4 as controlled by the angle adjustment pin 30, and by appropriate height adjustment of the hoof receptacle as controlled by the locking bolts 20, the leg and hoof support stand may be adjusted to accommodate horses of different sizes.

While the preferred forms and embodiments of the invention have been illustrated and described, it will be apparent to those of ordinary skill in the art that various changes may be made without deviating from the inventive concepts set forth above.

What is claimed is:

1. A support stand for supporting the hoof of a horse, comprising
   (a) a base member adapted for seating on a horizontal support surface;
   (b) a vertical support rod having upper and lower ends, said support rod lower end being adjustably connected with said base member for sliding movement between vertically spaced positions relative to said base member;
   (c) a pivot assembly connected with said support rod upper end;
   (d) a hoof receptacle connected with said pivot assembly, said hoof receptacle including a concave bottom wall, a flat rear wall and opposed side walls defining an open topped chamber that is open at its forward end for receiving the horse hoof; and
   (e) an angle adjustment mechanism connected with said pivot assembly for adjusting the angular orientation of said hoof receptacle relative to said vertical support rod.

2. A support stand as defined in claim 1, wherein said base member includes:
   (1) a lower base portion
   (2) an upper pedestal portion that extends upwardly from said base portion, said base member pedestal portion containing a vertical bore for receiving said support rod lower end, said support rod lower end containing a plurality of spaced openings; and
   (3) a locking bolt threadably connected within a threaded bore in said upper pedestal portion for engaging a selected opening in said rod lower end for locking said support rod in a selected one of said vertically spaced positions.

3. A support stand as defined in claim 2, wherein the upper end of said support rod contains a slot to define a pair of spaced walls of said support rod, and further wherein said pivot assembly comprises
   (1) a horizontal pivot shaft connected between upper ends of the spaced walls, said pivot shaft being parallel with said receptacle rear wall; and
   (2) an angle adjustment plate having:
      (a) an upper portion orthogonally arranged relative to, and rigidly secured to, the rear surface of said receptacle rear wall;
      (b) an intermediate portion pivotally mounted on said pivot shaft; and
      (c) a lower portion that extends into said slot.

4. A support stand as defined in claim 3, wherein said angle adjustment mechanism comprises an angle adjustment pin mounted for axial sliding displacement in a bore contained in one wall of the vertical support rod from a retracted position toward an angle setting position within a selected one of a plurality of spaced angle setting openings contained in said angle adjustment plate lower end portion.

* * * * *